April 20, 1965    C. W. HANSEN    3,178,846
FISH LURE RETRIEVER
Filed July 10, 1963
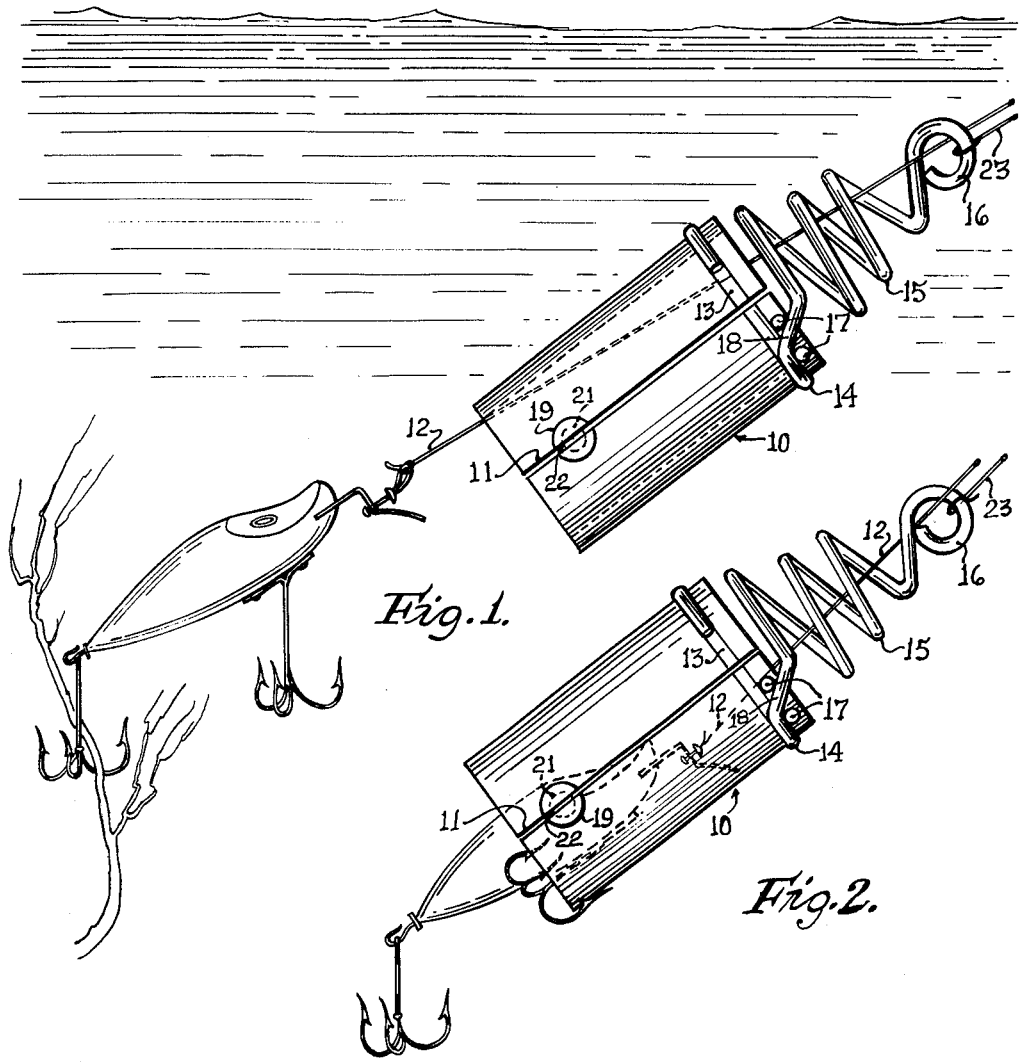
Fig.1.
Fig.2.
Fig.3.
INVENTOR.
CLARENCE W. HANSEN
BY
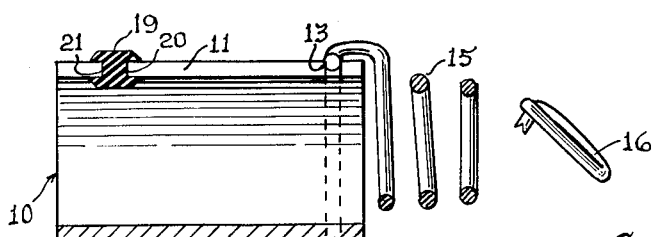
HIS ATTORNEY.

United States Patent Office 3,178,846
Patented Apr. 20, 1965

3,178,846
FISH LURE RETRIEVER
Clarence W. Hansen, 2200 E. Higgins Road,
Elk Grove Village, Ill.
Filed July 10, 1963, Ser. No. 294,055
4 Claims. (Cl. 43—17.2)

My invention relates to a new and useful improvement in a fish lure retriever and, more particularly, to a device that is so designed as to permit the same to be effectively employed for releasing hooks or fishing lures from foreign objects beneath the surface of the water.

An important object of my invention is to provide in a fish lure retriever a means whereby the same may be conveniently and properly threaded upon the fishing line so that the retriever may be caused to be guided down such line to any depth for engaging and forcibly releasing at the end of such fishing line any foreign object.

A further object of my invention is to provide in a device of this character a simplified means for slidably positioning the retriever on to a fishing line while supporting the weight thereof by its own supplemental line by which the retriever may be repeatedly raised and lowered along the fishing line so as to disengage the hook by striking or bumping it way from the snagged obstruction.

Other objects will appear hereinafter.

The invention consists in the novel combination and arrangement of parts to be hereinafter described and claimed.

The invention will be best understood by reference to the accompanying drawings showing the preferred form of construction, and in which:

FIG. 1 is a perspective view of my improved fish lure retriever;

FIG. 2 is a perspective view of my fish lure retriever in its relation to a snagged fish lure, and FIG. 3 is a detailed sectional view of my improved fish lure retriever.

The fish lure retriever of my invention comprises an open end hollow tubular body 10 made from a non-buoyant material. The body 10 has formed in the side wall thereof a longitudinally extending slot 11 through which a fishing line 12 may be passed into the interior of the body 10.

The body 10 has formed in its peripheral edge adjacent one end, a circumferentially extending groove 13. Adapted to be disposed in this groove 13 is the open bottom coil 14 of a conically shaped line guide 15. This line guide 15 is formed from a piece of spring wire wound spirally in spaced convolutions and which terminates at the vertex of its frusto-conical shape into an eye 16. The wall of the body 10 is provided with two small spaced apart studs 17 which extend laterally from the body at a point adjacent one end of the slot 11 between the groove 13 and the upper end of the body, as seen in FIGS. 1 and 2.

The open bottom coil 14 of the spirally formed line guide 15 is formed to provide an offset 18 which is caused to be positioned between the studs 17, as shown, so as to prevent axial displacement of the guide 15 with respect to the retriever body 10 and to prevent radial movement of such bottom coil 14 of the guide 15 through the groove 13. It should also be noted that the bottom coil 14 is of such a length and is so positioned by reason of the offset 18 formed therein and the studs 17, that such bottom coil 14 does not cross or close the slot 11.

Adjacent the bottom end of the body 10, and positioned in the slot 11 is a fishing line retaining means 19. This fishing line retaining means 19 comprises a bushing having a reduced center shank 20 as seen in FIG. 3. This reduced shank 20 is adapted to be positioned in an opening formed in the side wall of the body 10. This opening is formed by confronting circular recesses 21 formed in the body 10 and in open communication with the slot 11.

The bushing 19 is preferably of a yieldable material such as rubber or the like and is equally divided by a slit 22 formed therein which is in alignment with the slot 11. In using the retriever to release a fouled lure, the fishing line 12 is passed through the slot 11 formed in the body and through the yieldable slit 22 formed in the bushing 19. The fishing lure retriever 10 is rotated about its longitudinal axis causing the fishing line 12 to be wound into the spiral line guide 15 until the line passes through the eye 16 and the body 10, as seen in FIG. 1.

A retriever line 23 is also attached to the eye 10 of the guide 15 and by such line 23, the retriever is permitted to be lowered in the water and be guided to the fouled lure by the fishing line 12. The fishing lure will be caused to be partially displaced within the hollow body 10 of the retriever, as seen in FIG. 2, and in normal operation through the weight of the body 10, the snagged hooks of the retriever will be caused to be freed. However, if the weight of the retriever body 10 is not sufficient to effect the release of the fish lure, the retriever may be caused to quickly slide up and down the fish line 12, striking or bumping the fouled lure until it is freed.

As shown in FIGS. 1 and 2, the fishing line 12 is guided by the eye 16 which lies in a co-planar relation with the center line of the body 10. This relation of parts maintains the retriever in a correctly tilted position with respect to the fishing line 12 so that the fishing lure is readily drawn into the open bottom end of the body 10, as seen in FIG. 2.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. In a fish lure retriever
   (a) an open-ended non-buoyant tubular body having a slot formed longitudinally through the side wall thereof,
   (b) means including coils carried at one end of said body for guiding a fish line that has been passed through said slot and into said tubular body,
   (c) means for connecting said line guide to one end of said body with said coils thereof extending axially of said body, means for positioning said guide means at one end of said body so as not to interfere with lateral movement through said slot,
   (d) a yieldable bushing carried by said body and extending into a portion of said slot and having a normally closed slit formed therein in registration with said slot for yieldably receiving under pressure the fish line as it is caused to pass through said slot and into said tubular body, said bushing resisting accidental displacement of said fish line from within said body as the retriever is caused to move up and down the fish line, and
   (e) a supplemental line connected to one end of the line guide means for independently supporting said retriever upon said fish line so that the same may be moved up and down the fish line so as to strike and free a snagged fish lure connected to the end thereof.

2. In a fish lure retriever (a) an open-ended non-buoyant tubular body having a slot formed longitudinally through the side wall thereof,
(b) a frusto-conically shaped spirally coiled line guide carried at one end of said body for threadably receiving a fish line and for positioning the same relative to the longitudinal length of said body after it has been passed through said slot formed therein,
(c) means for connecting said line guide to one end of said body with said coils thereof extending axially of said body, means for positioning said guide at one end of said body so as not to interfere with lateral movement through said slot,
(d) a yieldable bushing carried intermediate the ends of said body and extending into a portion of said slot and having a normally closed slit formed therein in registration with said slot for yieldably receiving under pressure the fish line as it is caused to pass through said slot and into said tubular body, said bushing resisting accidental displacement of said fish line from within said body as the retriever is caused to move up and down the fish line, and
(e) a supplemental line connected to one end of the line guide for independently supporting said retriever upon said fish line so that the same may be moved up and down the fish line so as to strike and free a snagged fish lure connected to the end thereof.

3. In a fish lure retriever
(a) an open-ended non-buoyant tubular body having a slot formed longitudinally through the side wall thereof,
(b) a frusto-conically shaped spirally coiled line guide carried at one end of said body for threadably receiving a fish line and for positioning the same relative to the longitudinal length of said body after it has been passed through said slot formed therein,
(c) said body having formed in its side wall adjacent one end thereof a circumferentially extending groove, said groove adapted to receive a bottom open coil of said line guide so as to connect said line guide to said body so that coils thereof extend axially of said body,
(d) laterally extending spaced apart studs carried by said body and engaging a portion of said line guide for preventing axial displacement of said bottom open coil from said groove and to prevent said bottom open coil from becoming radially displaced so as to close said slot formed in the side wall of said body,
(e) a normally closed yieldable means carried intermediate the ends of said body and extending into a portion of said slot adjacent the opposite end of said body for resisting accidental displacement of the fish line from within said body as the retriever is caused to move up and down the fish line, and
(f) a supplemental line connected to one end of the line guide for independently supporting said retriever upon said fish line so that the same may be moved up and down the fish line so as to strike and free a snagged fish lure connected to the end thereof.

4. In a fish lure retriever
(a) an open-ended non-buoyant tubular body having a diameter of a size to receive a fish lure to be retrieved and provided with a slot formed longitudinally through the side wall thereof,
(b) a frusto-conically shaped spirally coiled line guide carried at one end of said body for threadably receiving a fish line and for positioning the same relative to the longitudinal length of said body after it has been passed through said slot formed therein,
(c) said body having formed in its side wall adjacent one end thereof a circumferentially extending groove, said groove adapted to receive a bottom open coil of said line guide so as to connect said line guide to said body so that coils thereof extend axially of said body,
(d) a yieldable bushing carried intermediate the ends of said body and extending into a portion of said slot and having a normally closed slit formed therein in registration with said slot for yieldably receiving under pressure the fish line as it is caused to pass through said slot and into said tubular body, said bushing resisting accidental displacement of said fish line from within said body as the retriever is caused to move up and down the fish line,
(e) a supplemental line connected to one end of the line guide for independently supporting said retriever upon said fish line so that the same may be moved up and down the fish line so as to strike and free a snagged fish lure connected to the end thereof.

References Cited by the Examiner

UNITED STATES PATENTS

| | | | |
|---|---|---|---|
| 2,472,207 | 6/49 | Gundel | 43—17.2 |
| 2,534,790 | 12/50 | Moore | 43—17.2 |
| 2,594,852 | 4/52 | Bivens | 43—17.2 |
| 2,641,078 | 6/53 | Gearien | 43—5 |
| 3,032,913 | 5/62 | Voll | 43—44.91 |

ABRAHAM G. STONE, *Primary Examiner.*